(12) United States Patent
Nanda et al.

(10) Patent No.: US 8,448,166 B2
(45) Date of Patent: *May 21, 2013

(54) AUTOMATED STATE MIGRATION WHILE DEPLOYING AN OPERATING SYSTEM

(75) Inventors: Sukanta Kumar Nanda, Redmond, WA (US); Daniel N. Drew, Valencia, CA (US); Anthony Baron, Woodinville, WA (US); Shantanu Sardesai, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/029,387

(22) Filed: Feb. 17, 2011

(65) Prior Publication Data

US 2011/0138375 A1 Jun. 9, 2011

Related U.S. Application Data

(63) Continuation of application No. 11/280,081, filed on Nov. 16, 2005, now Pat. No. 7,913,250.

(51) Int. Cl.
*G06F 9/455* (2006.01)
*G06F 15/177* (2006.01)

(52) U.S. Cl.
USPC ........... 717/176; 717/174; 717/177; 709/220; 709/221

(58) Field of Classification Search
None
See application file for complete search history.

(56) References Cited

U.S. PATENT DOCUMENTS

| 6,735,691 | B1 * | 5/2004 | Capps et al. ............... 713/1 |
| 2005/0177750 | A1 | 8/2005 | Gasparini et al. |
| 2006/0212746 | A1 | 9/2006 | Amegadzie et al. |

FOREIGN PATENT DOCUMENTS

| JP | 07253917 | 10/1995 |
| JP | 8227355 | 9/1996 |
| JP | 08227355 | 9/1996 |
| JP | 2005301824 | 10/2005 |
| KR | 200488438 | 10/2004 |
| KR | 200577422 | 8/2005 |
| WO | 03040893 | 5/2003 |

OTHER PUBLICATIONS

U.S. Appl. No. 12/280,081—Office Action, mailed Jul. 8, 2009.
U.S. Appl. No. 12/280,081—Office Action, mailed Feb. 3, 2010.
U.S. Appl. No. 12/280,081—Notice of Allowance, mailed Dec. 27, 2010.

(Continued)

*Primary Examiner* — Lewis A Bullock, Jr.
*Assistant Examiner* — Mark Gooray
(74) *Attorney, Agent, or Firm* — Workman Nydegger

(57) ABSTRACT

Migration of a user state from a source computing device to a destination computing device using a state migration point (SMP) is disclosed. The destination computing device may be the same as the source computing device but with a different operating system. The user state is securely stored by the SMP until the user state is restored on the destination computing device or a predetermined period of time has elapsed. Additional SMPs can be added without an architectural change. SMPs can be used to simultaneously migrate the states of multiple users of the source computing device to multiple destination computing devices. The SMPs can be restricted to migrate only the user states of computing devices with particular IP subnets. The SMPs can retain user states for a period of time after restoration in order to provide a backup, if necessary.

20 Claims, 9 Drawing Sheets

OTHER PUBLICATIONS

Office Action dated Jul. 8, 2009 U.S. Appl. No. 11/280,081 (Copy Attached).

Office Action dated Feb. 3, 2010 U.S. Appl. No. 11/280,081 (Copy Attached).

Notice of Allowance dated Dec. 27, 2010 U.S. Appl. No. 11/280,081 (Copy Attached).

* cited by examiner

AUTOMATED STATE MIGRATION WHILE DEPLOYING AN OPERATING SYSTEM

CROSS-REFERENCE TO RELATED APPLICATIONS

This application is a continuation of prior application Ser. No. 11/280,081 filed Nov. 16, 2005, titled "AUTOMATED STATE MIGRATION WHILE DEPLOYING AN OPERATING SYSTEM", which is incorporated herein by reference in its entirety.

BACKGROUND

Background and Relevant Art

Users who want to stay current with advancements in computer software, are constantly required to "up-grade" their computing devices. Computing devices include, but are not limited to desktop and laptop personal computers, personal digital assistants (PDAs), cellular telephones, etc. Computing devices are generically referred to herein as computers.

Upgrades range from applying a "patch" to an existing program to the installation of a different version of a software program, or in many instances the installation of a different operating system. The application of a patch to an existing program or the installation of a different version of a software program does not necessarily require the user to migrate the existing "state" of the entire computer. In most instances the patch or different version is applied locally at each computer without the migration of the existing state of the entire computer to a different location outside the computing environment of the computer. The "state" of a computer as used herein refers to user specific programs and data, such as, but not limited to, operating system user preferences, application programs, and the user specific data associated with the operating system and the application programs. Migration is the movement of a user's computer state to a remote location, such as a server hard-drive.

The installation of a different, usually new, operating system often requires that the state of the computer be migrated during the installation. Migration is often required regardless of whether the different operating system is to be installed on a user's current computer, or on a computer that is different from the user's current computer. More specifically, if the user does not want to perform other functions, for example, re-partition a hard drive, or replace an existing hard drive with a different one, the installation of a different operating system on a user's current computer may not require user state migration. Contrariwise, if the user does want to perform another function, for example re-partition a hard drive, when installing a different operating system on the user's current computer, the user state of the current computer has to be migrated before the different operating system can be installed and the hard-drive re-partitioned. After the different operating system is installed and the hard drive repartitioned, the user state is retrieved from the storage location and downloaded back onto the computer. Likewise, when a user obtains a new or replacement computer with an operating system that is different from the operating system of the user's current computer, the user often is required to migrate the state of the current computer to a remote location before the user's state can be downloaded onto the new computer. This is particularly true when a user's current computer is being shared with other users, each with a different state that is enabled when different user's log on, and the user is receiving a new computer intended for the sole use of the user.

Migrating computer state when changing operating systems is easier said than done. The migration of a user state often requires several steps that involve security clearances. Many users are handicapped by not being computer "savvy" or not knowing the finer details of the migration process. Such handicaps are usually circumvented by employing the expertise of a system or network administrator or some other such entity. Or, in the case of a business entity, by the user saving the state of the entire computer using the file share feature of a server. The file share feature of a server allows users within a computing network to have common access to a server where files can be stored. This feature allows a user within a computing network to exchange file contents with another user without using up storage space on the hard drive of the user's computer, making the user's computer accessible to the other user. While saving to a share file does not require a high level of computer knowledge, shared files are accessible to all the users within the computing network of the server. Hence, there is a possibility that the contents of a shared file will be altered, read, or written to by those who are not authorized to do so. Transforming sensitive and confidential contents to a shared file is a serious drawback of current user migration practice. The first alternative, i.e., employing the expertise of a system or network administrator or some other such entity, has its own drawbacks. Firstly, it is a financially costly alternative. Secondly, it is time consuming due to the planning required before the administrator performs the migration. The time delay is compounded if the ratio of system or network administrators to the number of users requiring migration is low.

In summary, the current procedures employed to migrate the state of a computer while deploying a new or different operating system are either financially expensive and time consuming, or risk migration to a non-secure location.

BRIEF SUMMARY

A method and a system for migrating a user state from a source computer and restoring it on a destination computer in an automated and secure manner is disclosed. The destination computer may be the same computer as the source computer with a different operating system, or it can be a different computer. The migration is designed to not require the assistance of a network or system administrator or some other such entity. According to one exemplary embodiment, a system, for example, a Server Management System (SMS), ensures that the migration is performed in a secure manner such that the user state is securely transmitted to a State Migration Point (SMP) that stores the user's state until the state is restored on the destination computer. If desired, the stored state on the SMP may be automatically deleted after a predetermined period of time. The automatic deletion of the stored state ensures that the SMP has free space available for another state without having to constantly increase its capacity. It is to be understood that the user's state is usually restored on the destination computer before deletion of the stored state.

According to another exemplary embodiment, the system includes more than one SMP to migrate the state depending on the migration load of a network. According to yet another exemplary embodiment, the system can simultaneously restore the state of a plurality of computers.

This Summary is provided to introduce a selection of concepts in a simplified form that are further described below in the Detailed Description. This Summary is not intended to identify key features or essential features of the claimed sub-

DETAILED DESCRIPTION

Figure 1:
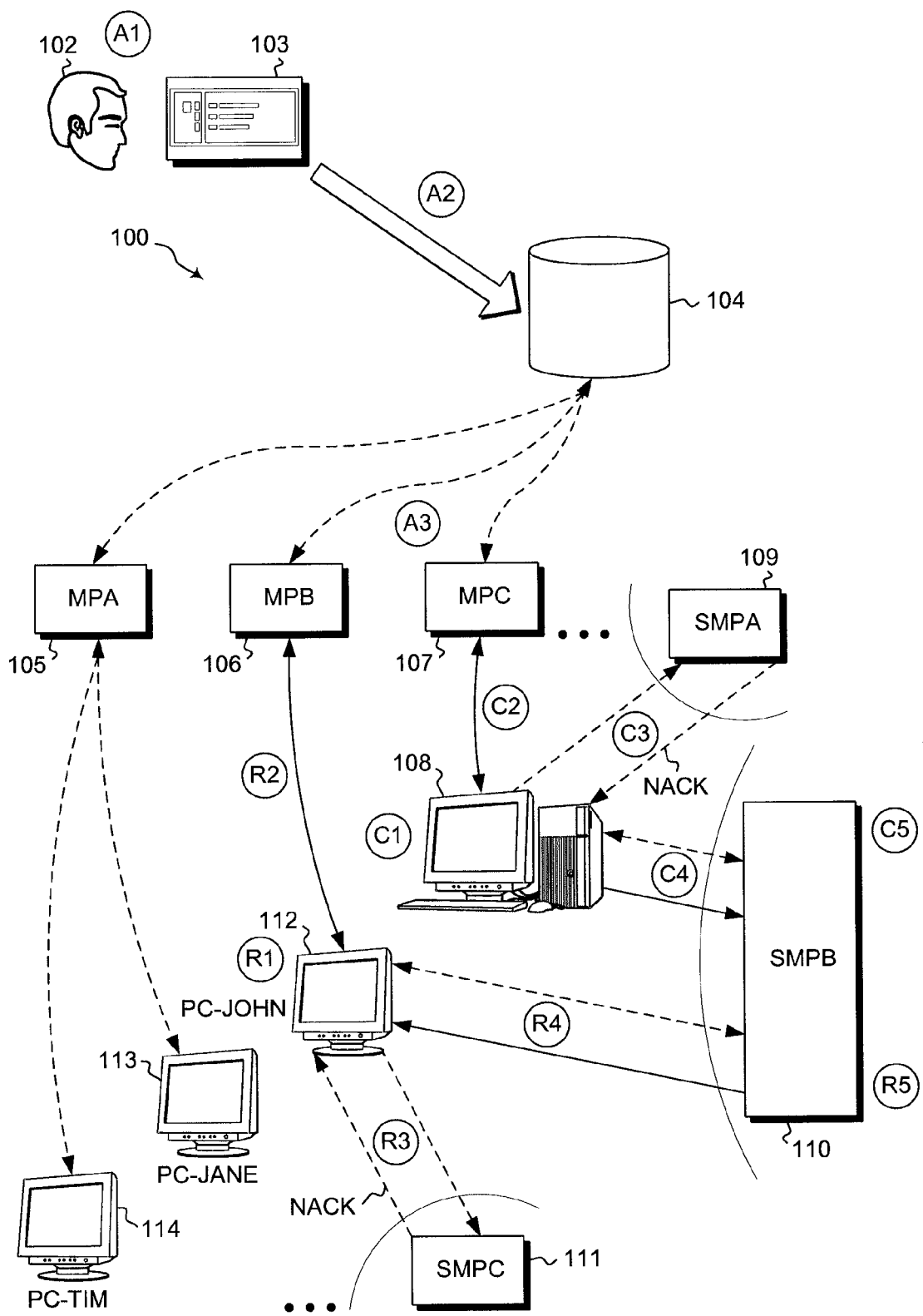
FIG. 1 is a pictorial diagram of an exemplary embodiment of the present invention.

FIG. 1 is a pictorial diagram of an exemplary system 100 and the actions that occur when the respective states of three users (identified as John, Jane, and Tim) of a common personal computer 108 are migrated to three separate personal computers 112, 113, and 114. As described more fully below, the system employs State Migration Points (SMPs). An SMP, as used herein, is a location in a server suitable for storing a user's state while the user's computer is being rebuilt, replaced, or upgraded.

Returning to FIG. 1, each user state is migrated from the common personal computer 108 to their separate personal computer. More specifically, John's user state is migrated from the common personal computer 108 to John's personal computer 112 (PC-John), Jane's user state is migrated from the common personal computer 108 to Jane's personal computer 113 (PC-Jane), and Tim's user state is migrated from the common personal computer 108 to Tim's personal computer 114 (PC-Tim). FIG. 1 illustrates the initial actions (A1, A2, and A3) that occur during the migration of the states of all three users of the common personal computer 108, plus the actions that occur during the capturing (C1-C5) and the restoring (R1-R5) of only John's user state from the common personal computer 108 to PC-John 112, it being understood that Jane and Tim's user states are captured and restored in a similar manner. It is also to be understood that the state migration actions, including the setting up of a pool of SMPs to capture and restore user states, and the capturing and restoring actions will be similar when a single user computer is being upgraded, rebuilt, or replaced for a single or multiple users instead of a single, three user computer being replaced with three separate computers as illustrated in FIG. 1 and described herein. It is further to be understood that the three users are to be taken as an exemplary, and not limiting since the described process can apply in a similar way to more or less users.

Initial actions A1, A2, and A3 are the actions that occur when setting up a pool of State Migration Points (SMPA, SMPB, and SMPC) to capture and restore the state of a user computer. At A1, a Server Management System (SMS) administrator 102 using a server 103 creates three computer associations for the three users of the common personal computer 108 as follows: (1) the common personal computer 108, PC-John 112, and John for user John; (2) the common personal computer 108, PC-Jane 113, and Jane for user Jane; and (3) the common personal computer 108, PC-Tim 114, and Tim for user Tim. That is, user John is associated with the identities of the common personal computer 108 and PC-John 112, user Jane is associated with the identities of the common personal computer 108 and PC-Jane 113, and user Tim is associated with the identities of the common personal computer 108 and PC-Tim 114.

The administrator 102 also assigns a create and target capture task (action C1) to the common personal computer 108, and a create and target restore task (action R1) to PC-John 112, PC-Jane 113, and PC-Tim 114. More specifically, the administrator assigns C1 to a software module included with common personal computer 108 and R1 to software modules included in PC-John, PC-Jane, and PC-Tim.

At A2, a cookie is created by the administrator and stored with the three computer associations created at A1 in a SMS database 104. According to one exemplary embodiment, the associations include the MAC addresses of the computers. At A3, the cookie and computer associations created and stored at A2 are replicated to a plurality of management points (MPs) MPA 105, MPB 106, MPC 107 . . . , three of which are shown in FIG. 1. As used herein, a management point (MP), like an SMP, is a database location. While SMPs capture and restore computer user states, MPs store a replication of the cookie and computer associations created by the SMS administrator. An MP acts as a liaison location between a user and the SMS from where the user can obtain the cookie and associations created by the SMS administrator, as well as a list of available SMPs. It is to be understood that a server whose tasks include storing a replication of a cookie and computer associations created by an SMP administrator can be the same server whose tasks include holding a user's state while the user's computer is being rebuilt, replaced, or upgraded. In other words, an MP server can also be an SMP server (and vice-versa) depending upon the situation. It is also to be understood that the functions of the SMPs and MPs can be performed by a single or multiple servers depending on the environment of use of embodiments of the invention.

Returning to FIG. 1, C1-C5 are the actions taken to capture the state of user John from the common personal computer 108 and store the state on SMPB 110. At C1, the capture task starts executing on the common personal computer 108. At C2, the common personal computer 108 communicates with MPC 107 to retrieve the machine association for John created at A1. In operation, the computer that needs migration randomly polls a pool of management points to retrieve the associations created for it in the SMS database 104. Thus, the common personal computer 108 could have randomly communicated with MPA 105 and/or MPB 106 before retrieving its association from MPC 107. For the sake of simplicity, these possibilities are not shown in FIG. 1. At C3, the common personal computer 108 randomly polls SMPA 109, i.e., sends a capture request to SMPA, which is denied (the arrow marked NACK). As will be explained below, there are several reasons for a denial of a capture request including the migration point having reached a maximum number of computers it can handle or the migration point not having enough space to store the entire state of the requesting computer. At C4, the common personal computer 108 polls SMPB 110, i.e., sends a capture request to SMPB, which is accepted. SMPB 102 creates a secure directory for storing the user state to be provided by the common personal computer 108. The common personal computer provides SMPB with the cookie created at A2, and the associations created at A1. SMPB stores the user state of all three users, i.e., John, Jane, and Tim, in a secure directory. According to one exemplary embodiment, SMPB stores the associations created at A1 and the user states separate from each other within the secure directory. At C5, SMPB creates a file, for example, State.cab, for storing the states of all three users of the common personal computer, and a file, for example, Done.dat, for keeping track of the captured user states and restore status of the captured user states.

R1-R5 are the actions that occur when restoring the state of user John from SMPB to PC-John 112. At R1, the restore task starts executing on PC-John. At R2, PC-John communicates with MPB 106 to retrieve the common personal computer/ PC-John/John association created at A1. As explained earlier, for the sake of simplicity, PC-John's communication with MPA 105 and/or MPC 107 may have occurred but is not shown. At R3, PC-John 112 randomly polls SMPC 111 for a restore request, which is denied (the arrow marked NACK). As will be explained below, since PC-John does not know which of the SMPs in the pool is storing its captured state, PC-John has to randomly poll the pool of SMPs until it finds the SMP that is storing its captured state. At R4, PC-John polls SMPB 110 for a restore request, which is accepted since SMPB 110 is storing PC-John's capture state. Then, SMPB 110 restores John's user state in PC-John, and at R5 the SMPB 110's database is updated to reflect the restore completion status of PC-John and the total count of computers remaining (if any) to restore user state is decremented by one.

As will be readily appreciated from the foregoing description, in the example illustrated in FIG. 1, migration software stored on the common personal computer 108 queries the SMS server 103 with its intention to upgrade, rebuild, or replace. The SMS server 103 provides the common personal computer (via one or more MPs) a list of available state management points (SMPs) depending on the network layout, company infrastructure, or other factors discussed below with respect to FIGS. 8, 9, and 10. If only one SMP is listed, the common personal computer 108 queries that SMP until it receives a response indicating that space is available. If more than one SMP is listed, and if the first SMP that the common personal computer 108 queries does not have available space, the common personal computer queries the next SMP on the list in a round-robin manner. The common personal computer queries all of the SMPs until space is found or all SMPs have been queried. After the common personal computer has exhausted querying all the SMPs in the list, it may time out for a predetermined period of time before it restarts the querying process.

When an SMP grants space to the common personal computer, the SMP creates a secure directory for the computer. The SMP then obtains and stores information that identifies the common personal computer 108 in a database, associates the entry in the database with the created directory, and changes the permission of the created directory to WRITE ONLY for the common personal computer. In the case of a computer being upgraded or rebuilt, the MAC address of the computer is one element of the identifying information stored in the database. Also in the case of an upgraded or rebuilt computer, the common personal computer tags the SMP that granted or found the space. In the case of a common personal computer being replaced by one or more new computers, the MAC address of the common personal computer and its association with the MAC address or addresses of the new computer(s) (which has to be known prior to the migration request) are included in the associations identifying information stored in the database. In other words, since the MAC address of the common personal computer being upgraded, rebuilt, or replaced is used to associate the MAC address of the corresponding upgraded, rebuilt, or replaced computer(s), the migration of the state of the common personal computer can only be completed on the corresponding upgraded, rebuilt, or replaced computer(s) if the association matches. Next, the common personal computer writes its state in the secure directory. After the common personal computer finishes writing its state in the secure directory, the common personal computer informs the SMP that it has finished writing to the directory. The SMP then changes the directory permission from WRITE ONLY to NO ACCESS.

After the common personal computer 108 has been upgraded, rebuilt, or replaced and is ready for state migration, the upgraded, rebuilt, or replaced computer migrates the state data from the secure directory. In the case of a rebuilt or upgraded common personal computer, since the computer is already known to the SMS server 103, and since the common personal computer tagged (identified) the SMP that has the computer's previous state, the computer knows which SMP has stored the previous state and, thus, only queries that SMP until the SMP is ready to migrate the computer's state as discussed below.

When the SMP is ready for state migration, the SMP authenticates the rebuilt or upgraded computer requesting state migration and changes the permission of the directory from NO ACCESS to READ ONLY. According to one exemplary embodiment, the MAC address of the requesting computer is compared with the MAC address stored in the database. As discussed above, if the MAC addresses are the same, the rebuilt or upgraded computer is given permission to migrate the computer's stored state, else permission is denied.

Because a replaced or new computer does not know which SMP has stored the state of the computer being replaced, the replaced or new computer has to randomly query all available SMPs. The SMP that is handling the migration authenticates the replaced computer and changes the permission of the directory from NO ACCESS to READ ONLY. According to one exemplary embodiment, the MAC address of the requesting computer is compared with the MAC address in the database. As discussed above, if the MAC address of the requesting computer matches a MAC address associated with the prior common personal computer whose state is saved in the database, the SMP gives permission to the replaced computer to migrate its previous state, else the permission is denied.

After the previous state migration is complete, the replaced, upgraded, or replaced computer so informs the SMP. The SMP then changes the secure directory permission from READ ONLY to NO ACCESS. The SMP deletes the state of the computer stored in the secure directory a predetermined length of time after the migration process is finished. The state is retained in the SMP for the predetermined length of time to allow a user of the upgraded, rebuilt, or replaced computer to retrieve all or part of the previous state in case the upgraded, rebuilt, or replaced computer does not respond as expected. The state is deleted after the predetermined length of time to free space on the SMP for other users who wish to migrate the state of their computer.

Figure 2:
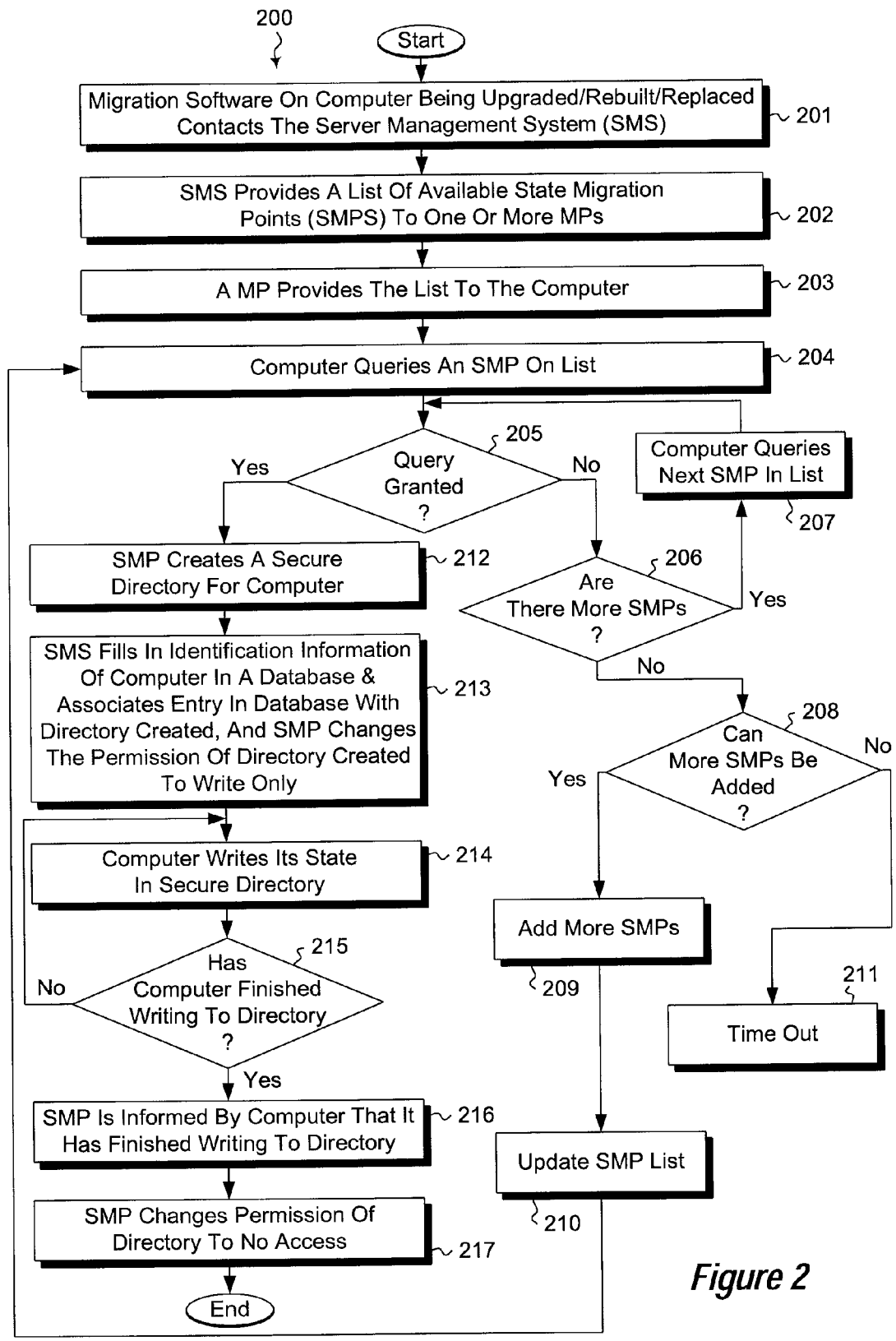
FIG. 2 is a functional flow chart of an exemplary scenario where a user state of a computer being upgraded, rebuilt, or replaced is migrated to a state migration point (SMP)

FIG. 2 is a functional flow chart that illustrates an exemplary scenario 200 where a user state of a computer being upgraded, rebuilt, or replaced is migrated to an SMP. That is, the flow chart ends where data is securely stored in an SMP. At block 201, the migration software on the computer being upgraded, rebuilt, or replaced contacts the SMS server 103. At block 202, the SMS server provides a list of available SMPs to one or more MPs. At block 203, a MP provides the list of available SMPs to the computer being upgraded, rebuilt, or replaced. Next, at block 204, the computer being upgraded, rebuilt, or replaced queries an SMP on the list to determine if the SMP has available storage space. Next, at decision block 205, a test is made to determine if the query by the computer is granted. If the query is not granted, at block 206, a check is made to determine if there are more SMPs on the list. If there are more SMPs on the list (the "Yes" branch), at block 207, the computer being upgraded, rebuilt, or replaced queries the next SMP on the list and the flow returns to block 205. If there are no more SMPs on the list, a report is sent to the SMS administrator 102, who at block 208 checks to determine if more SMPs can be added to the list. If one or more SMPs can be added to the list, at block 209, one or more SMPs are dynamically added to the list of available SMPs on the one or more MPs. Next, at block 210, the SMS server 103 updates the list of available SMPs for the computers being upgraded, rebuilt, or replaced waiting to contact the SMS server, and the flow returns to block 204. If at block 208, the administrator determines that one or more SMPs cannot be added to the list of available SMPs, at block 211, the computer being upgraded, rebuilt, or replaced times out, i.e., delays another query for a predetermined period of time.

Returning to block 205, when the query is granted (the "Yes" branch), at block 212, the SMP creates a secure directory for the computer being upgraded, rebuilt, or replaced. Next, at block 213, the SMS server fills in the identification information of the computer being upgraded, rebuilt, or replaced in a database, associates entry in database with the directory created at block 212, and the SMP changes the permission of the directory to WRITE ONLY. Next, at block 214, the computer being upgraded, rebuilt, or replaced writes its state data in the secure directory. Then, at block 215, a check is made to determine if the computer being upgraded, rebuilt, or replaced has finished writing to the directory. If directory writing is not finished (the "No" branch), block 214 is repeated until the computer being upgraded, rebuilt, or replaced has finished writing to the directory. After the computer being upgraded, rebuilt, or replaced has finished writing to the directory (the "Yes" branch), the SMP is informed by the computer, at block 216, that directory writing is finished. Finally, at block 217, the SMP changes the permission of the directory to NO ACCESS.

Figure 3:
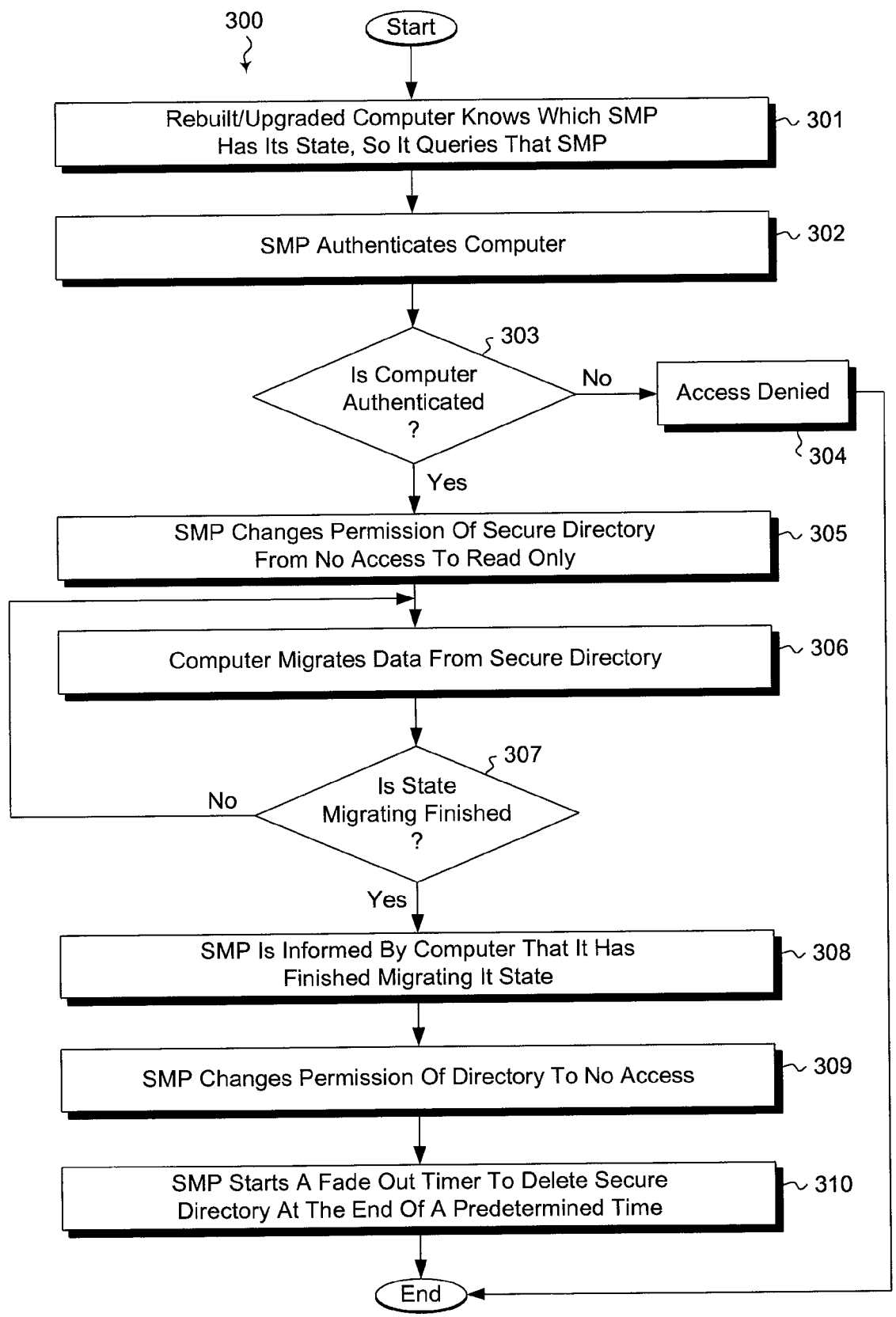
FIG. 3 is a functional flow chart of an exemplary scenario where a rebuilt or upgraded computer is restored to a state securely stored in a SMP.

FIG. 3 is a functional flowchart that illustrates an exemplary scenario 300 where a rebuilt or upgraded computer is restored to a state stored securely in an SMP. That is, in this scenario, the user's state is returned to the same computer after the computer has been rebuilt or upgraded. Since, the rebuilt or upgraded computer knows which SMP has its state, at block 301 the rebuilt or upgraded computer queries that SMP. At block 302, the SMP authenticates the rebuilt or upgraded computer. As mentioned above, one way to authenticate the rebuilt or upgraded computer is to check its MAC address which is included in a cookie stored at block 213 of FIG. 2. At block 303, the SMP checks to see if the rebuilt or upgraded computer is authentic. If the rebuilt or upgraded computer is not authentic, at block 304 access is denied. If, on the other hand, the rebuilt or upgraded computer is authentic, at block 305 the SMP changes the permission of the secure directory, created at block 211 of FIG. 2, from NO ACCESS to READ ONLY. At block 306, the rebuilt or upgraded computer migrates the state stored in the secure directory. At block 307, a check is made to determine if the state migration is finished. If not, state migration continues. When state migration is finished, at block 308, the rebuilt or upgraded computer so informs the SMP. Next, at block 309, the SMP changes the permission of the directory from READ ONLY to NO ACCESS. Finally, at block 310, the SMP starts a fade-out timer that results in the deletion of the secure directory created for the rebuilt or upgraded computer at the end of a predetermined time. Block 310 is necessary in order to free up storage space in the SMP for other computers to perform a state migration. The predetermined time during which the directory is retained on the SMP after the state migration has occurred depends on policies established by the network administrator 102. As mentioned above, it is beneficial to retain the directory for a certain period of time after state migration because the rebuilt or upgraded computer may have unforeseen problems that may require retrieval of all or part of the data stored in the directory. As noted above, deletion of the stored state at the end of the predetermined length of time frees SMP storage space for other users to use for state migration.

Figure 4:
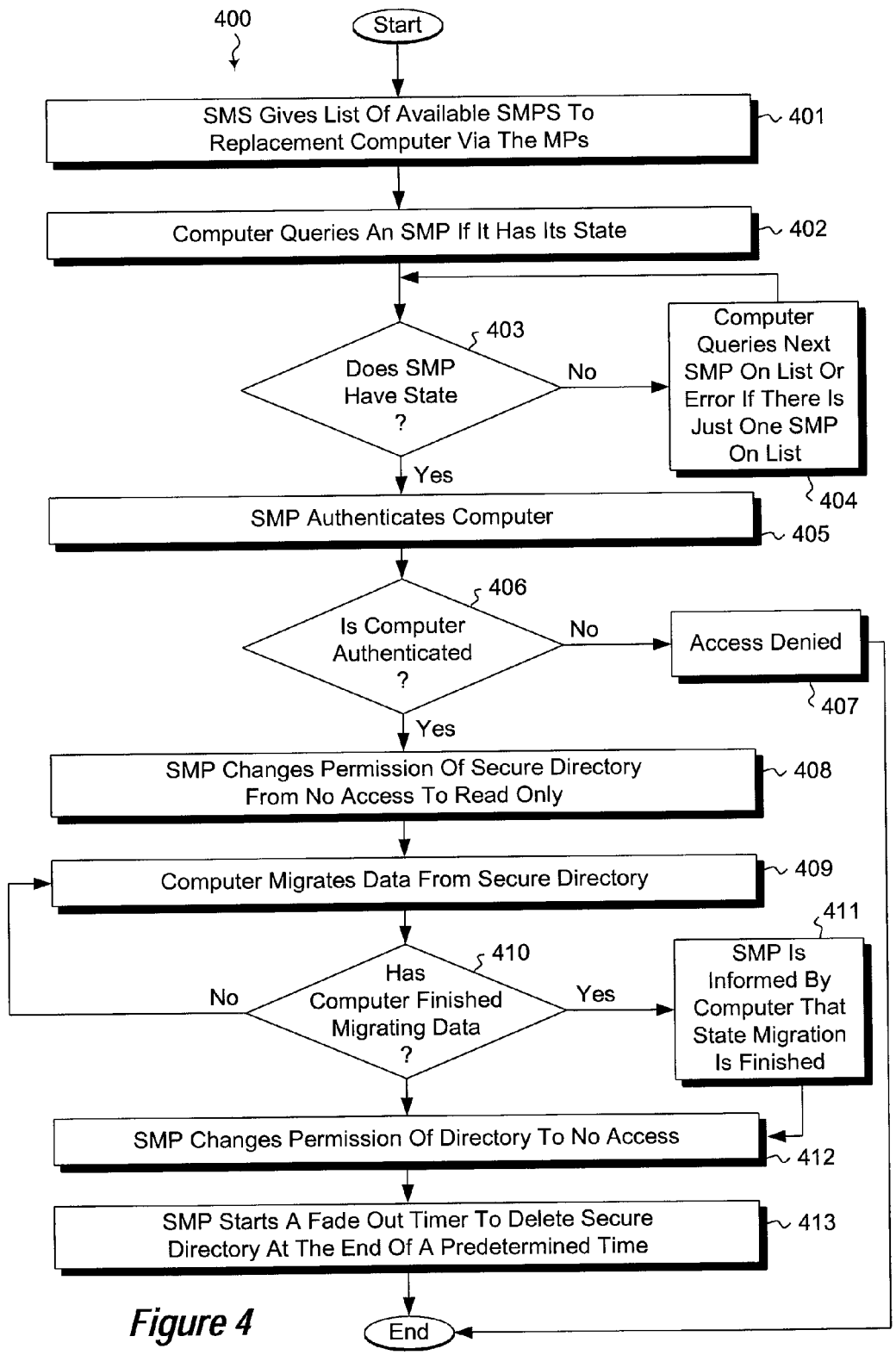
FIG. 4 is a functional flow chart of an exemplary scenario where a replacement (new) computer is restored to a state securely stored in a SMP.

FIG. 4 is a functional flowchart that illustrates an exemplary scenario 400 where a replacement computer, such as a new computer, is reset to a state securely stored in a SMP. At block 401, in response to a query from the replacement computer, the SMS gives a list of available SMPs to the computer via the MPs. At block 402, the computer queries a SMP to determine if the SMP is storing the state information. At block 403, a check is made of the response to the query. If the SMP is not storing the state information (the "No" branch), at block 404 the computer queries the next SMP on the list, or if there is just one SMP on the list, an error report is generated. When the SMP queried at block 403 is found to have the previous state information (the "Yes" branch), at block 405, the SMP seeks to authenticate the replacement computer. Next, at block 406, a check is made by the SMP to see if the replacement computer has been authenticated. One way to authenticate the replacement computer is by comparing the computer's MAC address with a stored MAC address entered by the user or the SMS administrator. If the replacement computer is not authenticated at block 406 (the "No" branch), at block 407 access is denied. If the replacement computer is authenticated (the "Yes" branch), at block 408 the SMP changes the permission of the secure directory created at block 212 of FIG. 2 from NO ACCESS to READ ONLY. Next, at block 409, the replacement computer migrates the state information from the secure directory. Then, at block 410, a check is made to see if state migration is finished. If state migration is not finished (the "No" branch), state migration continues. If state migration is finished (the "Yes" branch), at block 411, the SMP is informed by the replacement computer that state migration is finished. At block 412, the SMP changes the permission of the directory to NO ACCESS. Finally, at block 413, the SMP starts a fade-out timer that results in the deletion of the secure directory at the end of a predetermined time, for the reasons described above with respect to block 310 of FIG. 3.

Figure 5:
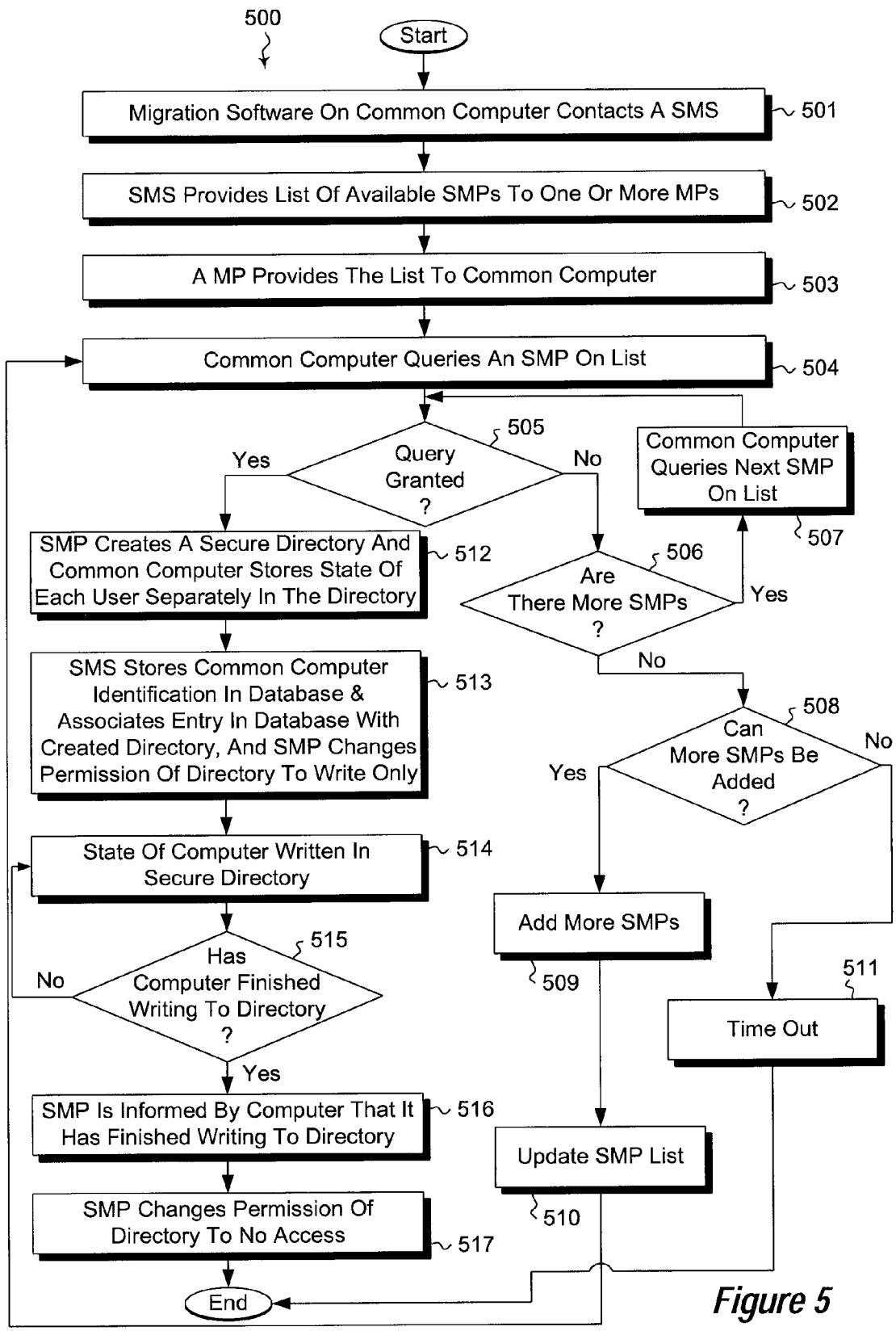
FIG. 5 is a functional flow chart of an exemplary scenario where the states of multiple users of a computer are migrated to an SMP.

FIG. 5 is a functional flowchart that illustrates an exemplary scenario 500 where the state of one or more users of a computer migrate to an SMP. For example, many users of a common personal computer may be migrating to individual user computers as generally illustrated in FIG. 1 and discussed above. The individual user computers may be upgraded, rebuilt, or replacement computers.

In another example, two of the three users of a common personal computer might migrate to a computer that they are going to share, while the third user migrates to a computer that only he/she is going to use in the future. FIG. 5 illustrates the scenario up to the point where state data is transferred from the common computer to, and stored in, a SMP.

At block 501, the migration software on the common computer advises the SMS server of the migration desire. At block 502, the SMS server 103 provides a list of available SMPs to one or more MPs. At block 503, a MP provides the list of available SMPs to the common computer. At block 504, the common computer queries an SMP on the list to determine if the SMP has state migration storage space. At block 505, a check is made of the response to this query. If the query is not granted, i.e., the queried SMP does not have state migration storage space (the "No" branch), at block 506, a check is made to determine if there are more SMPs on the list. If there are more SMPs on the list (the "Yes" branch), at block 507, the common computer queries space from the next SMP on the list to determine if that SMP has state migration storage space. Then the flow returns to block 505. If there are no more SMPs on the list, a report is sent to the SMS administrator 102, who at block 508 checks to determine if more SMPs can be added to the list. If one or more SMPs can be added to the list, at block 509, one or more SMPs are dynamically added to the list of available SMPs. Next, at block 510, the SMS server 103 updates the list of available SMPs for the common computers waiting to contact the SMS server, and the flow returns to block 504. If at block 508, the SMS administrator determines that one or more SMPs cannot be added to the list of available SMPs, at block 511, the common computer times out, i.e., delays another query for a predetermined period of time.

Returning to block 505, if the query is granted (the "Yes" branch), at block 512, the SMP creates a secure directory for the common computer, and the common computer stores the state of each user of the common computer separate from the other users within the secure directory. At block 513, the SMS server stores information that identifies the common computer in a database, associates the entry in the database with the secure directory created at block 512, and the SMP changes the permission of the directory to WRITE ONLY. At block 514, the common computer writes the state of the common computer in the secure directory. Then, at block 515, a check is made to determine if the common computer has finished writing to the directory. If directory writing is not finished (the "No" branch), block 514 is repeated until the common computer has finished writing to the directory. After the common computer has finished writing to the directory (the "Yes" branch), the SMP is informed by the computer, at block 516, that directory writing is finished. Finally, at block 517, the SMP changes the permission of the directory from WRITE ONLY to NO ACCESS.

Figure 6:
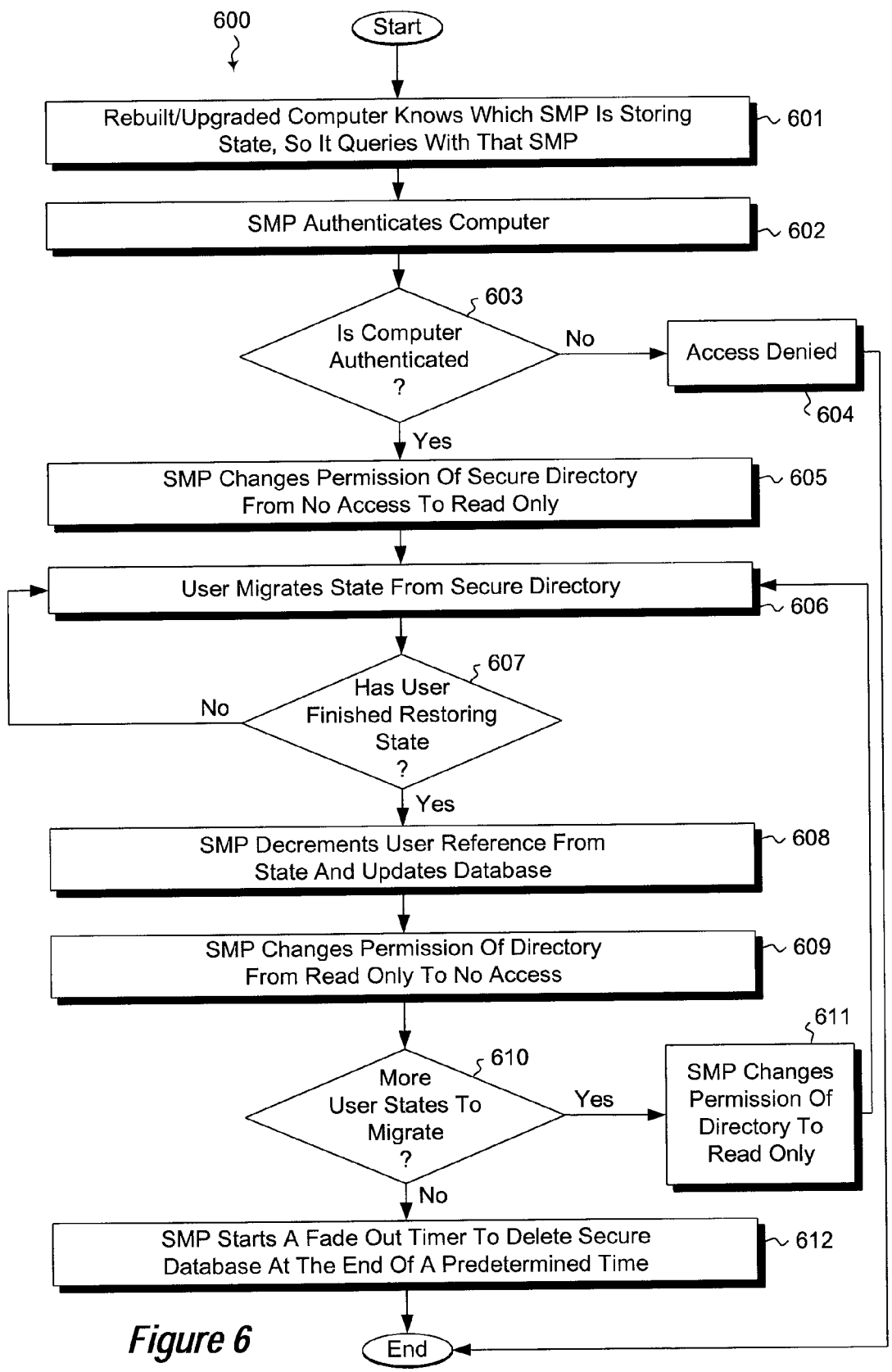
FIG. 6 is a functional flow chart of an exemplary scenario where a rebuilt/upgraded computer with many users is restored to a state securely stored in a SMP.

FIG. 6 is a functional flowchart illustrating an exemplary scenario 600 where a rebuilt or upgraded computer with many users is restored to the state stored securely in a SMP for each user. See FIG. 5 above. At block 601, since the rebuilt or upgraded computer knows which SMP is storing this state information, as previously mentioned, the rebuilt or upgraded computer queries that SMP. At block 602, the SMP authenticates the computer. As mentioned previously, one way to authenticate the computer is to compare the MAC address, which is included in the computer identification information stored at block 512 of FIG. 5, with the rebuilt or upgraded computer's MAC address. At block 603, a check is made by the SMP to determine if the rebuilt or upgraded computer has been authenticated. If the computer has not been authenticated, at block 604 access is denied. If, on the other hand, the rebuilt or upgraded computer has been authenticated, at block 605, the SMP changes the permission of the secure directory created at block 511 of FIG. 5 from NO ACCESS to READ ONLY. At block 606, the state of one of the users of the computer is migrated from the secure directory. At block 607, a check is made to determine if migration is finished. If not, migration continues. When migration is finished, at block 608, the SMP decrements the user reference from the state information and updates the database. At block 609, the SMP changes the permission of the directory from READ ONLY to NO ACCESS. At block 610, a check is made by the SMP to determine if there are more user states to migrate. If there are more users with states to migrate (the "Yes" branch), at block 611, the SMP changes the permission of the directory from NO ACCESS to READ ONLY, and the flow cycles back to block 606. If on the other hand, there are no more users with states to migrate (the "No" branch), at block 612, the SMP starts a fade-out timer that results in the deletion of the secure directory at the end of a predetermined time. As explained above with respect to block 310 (FIG. 3) and block 413 (FIG. 4), block 613 is necessary in order to free up space in the SMP for other users that want to conduct a state migration. As noted above, the length of the predetermined time during which the directory is retained on the SMP after a computer has finished state migration depends on the policies established by the SMS administrator 102.

Figure 7:
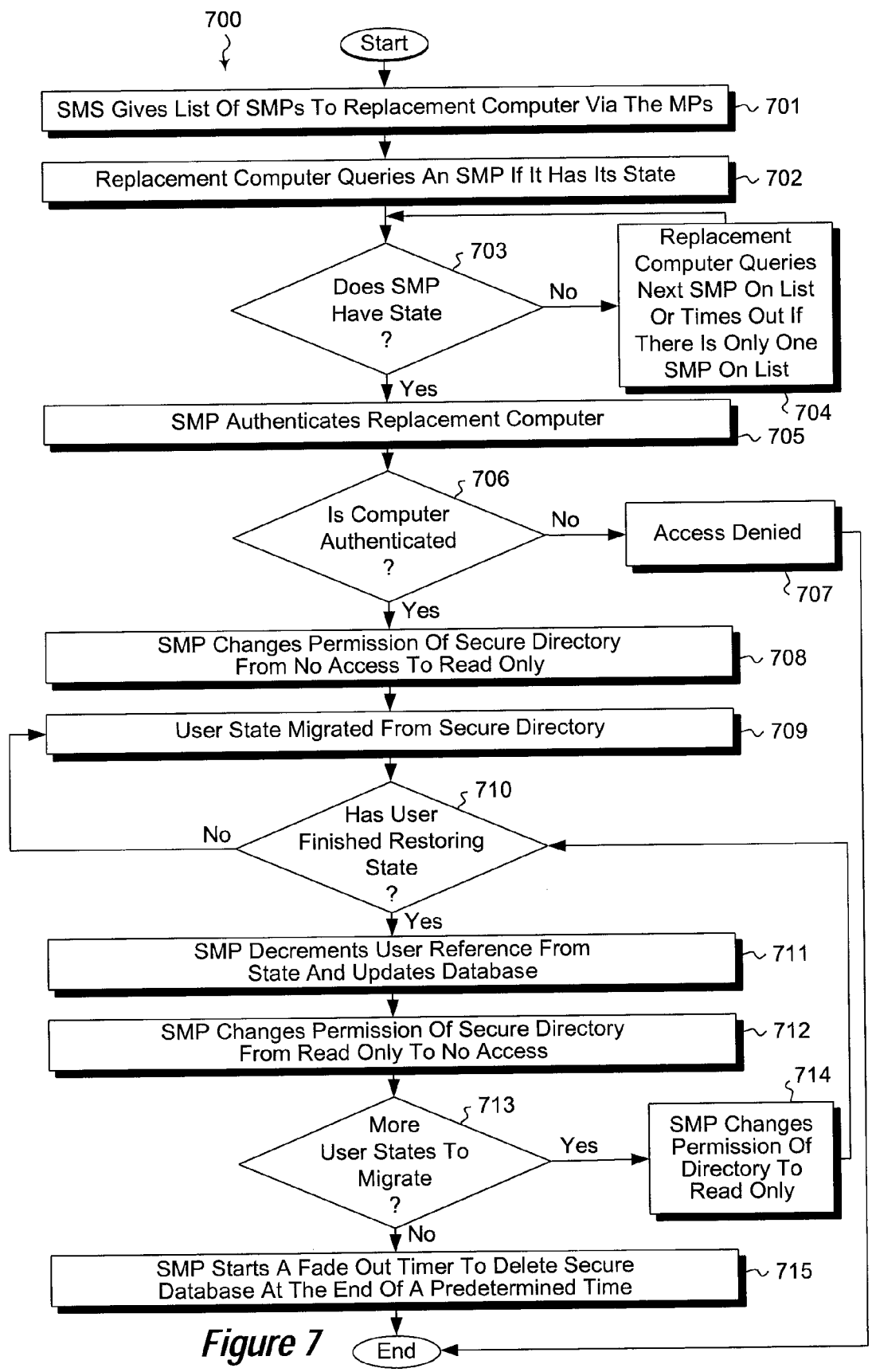
FIG. 7 is a functional flow chart of an exemplary scenario where a replacement computer with many users is restored to a state securely stored in a SMP.

FIG. 7 is a functional flowchart that illustrates an exemplary scenario 700 where a replacement computer, such as a new computer, with many users is restored to the states stored securely in a SMP for each user. See FIG. 5 above. At block 701, in response to the migration software on the replacement computer contacting the SMS server, the SMS server provides a list of SMPs to the replacement computer where the state information may have been stored previously. At block 702, the replacement computer randomly queries a SMP to determine if the SMP is storing its state information. At block 703, a check is made of the response for the query, i.e., a check is made to see if the SMP is storing the state information. If the SMP is not storing the state information of the replacement computer (the "No" branch), at block 704, the replacement computer queries the next SMP on the list, or times out for a predetermined length of time if there is just one SMP on the list. If, on the other hand, the SMP queried at block 703 is storing the state information being sought by the replacement computer (the "Yes" branch), at block 705, the SMP attempts to authenticate the replacement computer. At block 706, a check is made by the SMP to see if the replacement computer has been authenticated. As explained previously, one way to authenticate a computer is by comparing the computer's MAC address to a stored MAC address that identifies the correct computer. If the replacement computer is not authenticated at block 706 (the "No" branch), at block 707, access is denied to the computer. If, on the other hand, the replacement computer is authenticated (the "Yes" branch), at block 708, the SMP changes the permission of the secure directory created at block 506 of FIG. 5 from NO ACCESS to READ ONLY. At block 709, the state of a user of the replaced computer is migrated from the secure directory. Next, at block 710, a check is made to determine if migration is finished. If migration is not finished (the "No" branch), the flow cycles to block 709 and migration continues. When the user's state migration is finished (the "Yes" branch), at block 711, the SMP decrements the user state reference and updates the database. At block 712, the SMP changes the permission of the directory from READ ONLY to NO ACCESS. At block 713, a check is made by the SMP to determine if there are more user states to migrate. If there are (the "Yes" branch), at block 714, the SMP changes the permission of the directory from NO ACCESS to READ ONLY and the flow returns to block 709. If, on the other hand, there are no more user states to migrate (the "No" branch), at block 715, the SMP starts a fade-out timer that deletes the secure directory at the end of a predetermined time. As explained above, block 716 is necessary in order to free SMP space for use by other computers for state migration.

Figure 8:
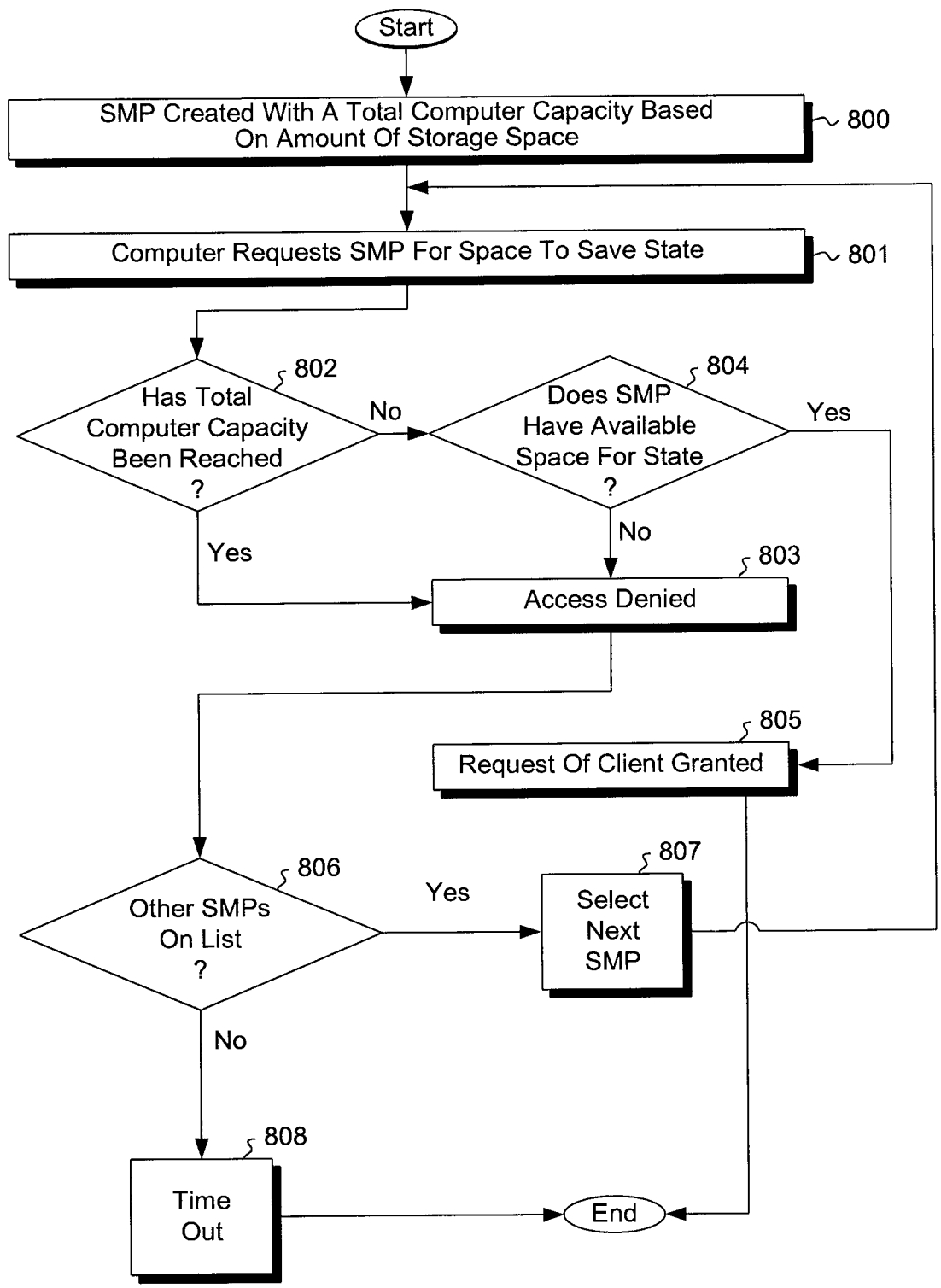
FIG. 8 is a functional flow chart that illustrates how a SMP in an exemplary manner stores a maximum number of computer states in the amount of storage space available on the SMP.

FIG. 8 is a functional flowchart that illustrates in an exemplary manner how a SMP stores the maximum number of computer states in the amount of storage space available on the SMP. At block 800, a SMP is created by a SMS. The created SMP is limited to a total computer capacity based on the maximum amount of space available for storing computer state information. At block 801, a computer requests a SMP space to save the computer's state or states. At block 802, a check is made to see if the total computer capacity has been reached. If the total capacity of the SMP has not been reached (the "No" branch), at block 804, another check is made to see if the SMP has space available to store the state or states of the computer making the request. If the SMP has a large enough space available to store the state or states of the requesting computer (the "Yes" branch), at block 805, the computer request is granted. If at block 802 it is determined that the total capacity of the SMP has been reached (the "Yes" branch from block 802), or at block 804 it is determined that the SMP does not have space available to store the state or states of the requesting computer (the "No" branch from block 804), at block 803, the computer request is denied. Then, at block 806, the computer checks to see if there are other SMPs on the list received from the SMS. If there are other SMPs on the list (the "Yes" branch), at block 807, the next SMP on the list is selected. Then the flow cycles to block 801. If there are no SMPs on the list (the "No" branch), at block 808, the flow times out. Thus, if there is only one SMP on the list, or all the available SMPs on the list have reached the maximum number of users they can handle, or there is not enough space available on the SMPs to store the state of the computer, the process times out and ends. As will be readily appreciated from the foregoing description, the functional flow illustration in FIG. 8 occurs during the check made at block 204 of FIG. 2 or block 504 of FIG. 5.

Figure 9:
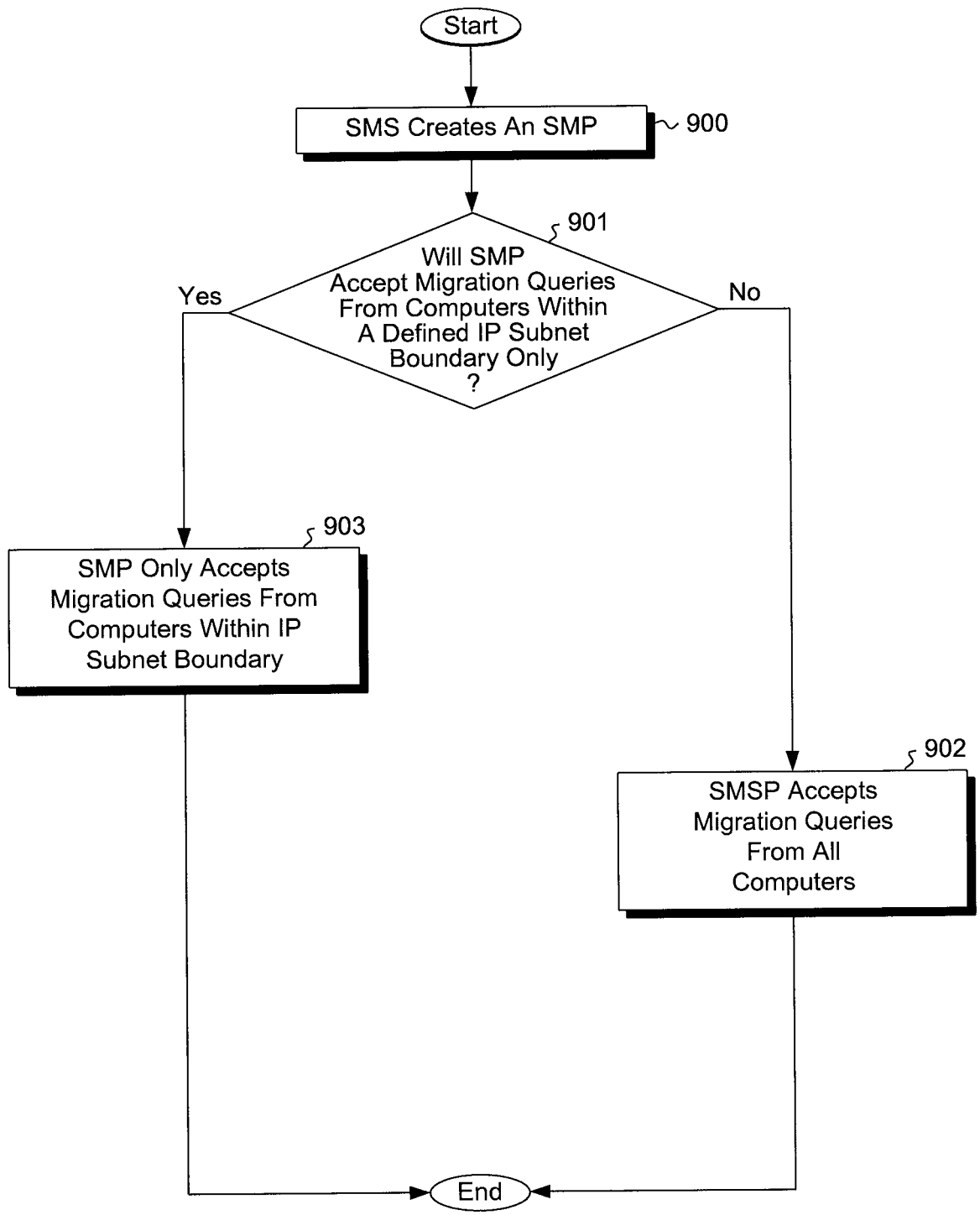
FIG. 9 is a functional flow chart of an exemplary scenario where a SMP migrates a state of a computer assigned a certain IP subnet address.

There could be a situation when an administrator decides that a SMP will only migrate the state of a computer assigned to a particular IP subnet address. This situation could arise when the flow of network traffic is slowed down due to many computers using a network to migrate their state simultaneously. For example, an organization may have many computers with different IP subnet addresses within a small geographical area. If a large majority of users within the small geographical area decide to migrate their computer state at the same time, and if there are only a limited number of SMPs configured to handle the migration, a bottle-neck is created. The administrator may, at this point, decide to dynamically assign the available SMPs to migrate the state of only computers assigned a particular IP subnet address in addition to adding more SMPs. FIG. 9 is a functional flow chart of an exemplary scenario where a SMP is created to migrate the state of computers assigned a particular IP subnet address only. At block 900, a SMP is created by a SMS. At block 901, a check is made to determine if the SMP will accept queries only from computers within a defined IP subnet boundary. If the SMP accepts migration queries only from computers within a defined IP subnet boundary (the "Yes" branch), at block 903, migration queries from all computers within the defined IP subnet boundary are accepted by the SMP. Conversely, if a querying computer is not assigned the defined IP subnet that the SMP handles, then a migration query from the computer is denied by the SMP. If, on the other hand, the SMP accepts migration queries from all computers within the organization, at block 902, migration queries from all computers within the organization are accepted by the SMP irrespective of the IP subnet addresses of the querying computers. It is to be understood that, as shown in FIG. 8 and described above, the acceptance of a migration query by a SMP depends on the availability of migration space on the SMP discussed earlier.

While illustrative embodiments have been illustrated and described, it will be appreciated that various changes can be made therein without departing from the spirit and scope of the invention. For example, the computers, i.e., the computing devices, illustrated in FIG. 1 are depicted as personal computers (PCs). This should be construed as exemplary and not limiting since the invention may also find applicability in other types of computing devices, such as PDAs, cellular telephones, etc. Thus, while a preferred embodiment of a method and a system for migrating user state data while deploying an operating system has been described herewith, it is to be understood that the invention is not limited to this embodiment. Rather the invention is defined by the following claims and their full scope of equivalents.

What is claimed is:

1. A server management system for migrating a user state of a computing device from a source computing device to a destination computing device, comprising:
   (a) a plurality of state migration points ("SMP") suitable for securely storing the user state and association information of the source computing device in a state migration point directory ("SMP directory"), wherein the SMP's have an accessible or inaccessible status;
   (b) a plurality of management points ("MP") suitable for storing association information, wherein each association information comprises the identity of the source computing device, with an identity of the destination computing device, and a list of the plurality of SMP's; and
   (c) one or more software modules configured to:
      (i) select one of the plurality of MP's to acquire and populate the association information;
      (ii) poll the SMP's on the list to locate a SMP having a capacity to store the user state of the source computing device in the SMP directory of the SMP being polled, change the state of the selected SMP to an accessible state and transferring the user state and association information of the source computing device to the SMP directory of the SMP for secure storage in the SMP directory, when the transfer is complete change the SMP to an inaccessible state; and
      (iii) receive a request from the destination computing device for the user state,
      (iv) poll MP's to find destination computing devices association information,
      (v) poll SMP's on the list to locate the SMP containing the transferred user state, authenticating that the destination computing device matches the identity of the destination computing device associated with the identity of the source computing device;
      (vi) as a result of authentication, change the state of the SMP to an accessible state and transfer the user state of the source computing device securely stored in the SMP directory to the destination computing device, when the transfer is complete change the SMP to an inaccessible state.

2. The server management system of claim 1 wherein polling comprises sequentially polling the SMPs on the list to locate a SMP having a capacity to store the user state of the computing device in the SMP directory of the SMP being polled.

3. The server management system of claim 1 wherein receiving a request comprises randomly receiving a request at an SMP.

4. The server management system of claim 1 wherein the capacity of one or more SMPs is based on the number of computers being handled by the one or more SMPs.

5. The server management system of claim 1 wherein the source computing device and the destination computing device are a same computing device.

6. A method of migrating a user state of a computing device from a source computing device to a destination computing device, comprising:
   setting up a pool including a plurality of state migration points ("SMPs") suitable for securely storing the user state and association information of the source computing device in a state migration point directory ("SMP directory), wherein the SMP's have an accessible or inaccessible state;
   setting up a pool including a plurality of management points ("MP") suitable for storing association information, wherein each association information comprises the identity of the source computing device with an identity of the destination computing device, and a list of the plurality of SMP's;
   selecting one of the plurality of MPs to acquire and populate the association information; and
   polling the SMP's on the list to locate a SMP having a capacity to store the user state of the source computing device in the SMP directory of the SMP being polled, changing the state of the selected SMP to an accessible state and transferring the user state and association information of the source computing device to the SMP directory of the SMP for secure storage in the SMP directory, when the transfer is complete change the SMP to an inaccessible state; and
   receiving a request from the destination computing device for the user state, polling MP's to find destination computing devices association information, polling SMP's on the list to locate the SMP containing the transferred user state, authenticating that the destination computing device matches the identity of the destination computing device associated with the identity of the source computing device; and
   as a result of authenticating, changing the state of the SMP to an accessible state and transferring the user state of the source computing device securely stored in the SMP directory to the destination computing device, when the transfer is complete changing the SMP to an inaccessible state.

7. The method of claim 6 wherein the source computing device includes a plurality of user states, each user state associated with a different user and wherein each of the plurality of user states is transferred to a separately identifiable location of the identified SMP and is separately stored at the separately identifiable location in the identified SMP, and each user state is associated with a different destination computing device from among a plurality of destination computing devices.

8. The method of claim 7 wherein the plurality of user states are each transferred from the SMP to an associated one of the plurality of destination computing devices after authenticating each one of the plurality of destination computing devices.

9. The method of claim 6 wherein the SMP creates a secure directory and wherein the user state of the source computing device is transferred to the secure directory for storage.

10. The method of claim 6 wherein polling comprises sequentially polling the SMPs on the list to locate a SMP having a capacity to store the user state of the computing device in the SMP directory of the SMP being polled.

11. The method of claim 6 wherein receiving a request comprises randomly receiving a request at an SMP.

12. The method of claim 6 wherein the capacity of one or more SMPs is based on the number of computers being handled by the one or more SMPs.

13. The method of claim 6 wherein the source computing device and the destination computing device are a same computing device.

14. A computer readable storage device, the device not being a signal, comprising computer executable instructions that when executed by one or more processors causes the following to be performed:
   setting up a pool including a plurality of state migration points ("SMP) suitable for securely storing the user state and association information of the source computing device in a state migration point directory ("SMP directory"), wherein the SMP's have an accessible or inaccessible status;
   setting up a pool including a plurality of management points ("MP") suitable for storing association information, wherein each association information comprises the identity of the source computing device with an identity of the destination computing device, and a list of the plurality of SMP's;
   selecting one of the plurality of MP's to acquire and populate the association information;
   polling the SMP's on the list to locate a SMP having a capacity to store the user state of the source computing device in the SMP directory of the SMP being polled, changing the state of the selected SMP to an accessible state and transferring the user state and association information of the source computing device to the SMP directory of the SMP for secure storage in the SMP directory, when the transfer is completes changing the SMP to an inaccessible state;
   receiving a request from the destination computing device for the user state, polling MP's to find destination computing devices association information, polling SMP's on the list to locate the SMP containing the transferred user state, authenticating that the destination computing device matches the identity of the destination computing device associated with the identity of the source computing device; and
   as a result of authenticating, change the state of the SMP to an accessible state and transfer the user state of the source computing device securely stored in the SMP directory to the destination computing device, when the transfer is complete change the SMP to an inaccessible state.

15. The computer readable storage device of claim 14 wherein the source computing device and the destination computing device have MAC addresses and wherein the source computing device and the destination computing device are associated using the MAC addresses.

16. The computer readable storage device of claim 14 wherein the capacity of one or more SMPs is based on the number of computers being handled by the one or more SMPs.

17. The computer readable storage device of claim 14 further comprising associating one source computing device with one or more destination computing devices.

18. The computer readable storage device of claim 14 wherein the SMP also stores information identifying the source computing device associated with the transferred user state.

19. The computer readable storage device of claim 14 wherein the source computing device includes a plurality of user states and wherein the destination computing device is one among a plurality of computing devices, wherein each of the user states is to be transferred to a different one of the computing devices in the plurality of computing devices.

20. The computer readable storage device of claim 14 wherein the source computing device and the destination computing device are different computing devices.

\* \* \* \* \*